United States Patent
Crawford

(12) 
(10) Patent No.: US 6,446,838 B2
(45) Date of Patent: Sep. 10, 2002

(54) VALVE ASSEMBLY FOR HAND OPERATED WATER GUN

(75) Inventor: Alan D. Crawford, Burbank, CA (US)

(73) Assignee: Original Ideas, Inc., Calabasas, CA (US)

( * ) Notice: Subject to any disclaimer, the term of this patent is extended or adjusted under 35 U.S.C. 154(b) by 0 days.

(21) Appl. No.: 09/912,572

(22) Filed: Jul. 26, 2001

Related U.S. Application Data

(60) Division of application No. 09/526,004, filed on Mar. 15, 2000, which is a continuation-in-part of application No. 09/296,183, filed on Apr. 26, 1999, now abandoned.

(51) Int. Cl.$^7$ ................................................. A63H 3/18
(52) U.S. Cl. ........................................ 222/79; 251/353
(58) Field of Search ........................... 222/79; 251/325, 251/344, 349, 353

(56) References Cited

U.S. PATENT DOCUMENTS

| | | | | |
|---|---|---|---|---|
| 2,760,754 A | * | 8/1956 | Gladstone | .................. 251/344 |
| 3,544,067 A | * | 12/1970 | Elmore | ........................ 251/344 |
| 4,055,179 A | * | 10/1977 | Manschot et al. | ........... 128/275 |
| 4,430,073 A | * | 2/1984 | Bemis et al. | .................. 604/48 |
| 5,492,148 A | * | 2/1996 | Goughneour et al. | .... 137/616.5 |

\* cited by examiner

*Primary Examiner*—Henry C. Yuen
*Assistant Examiner*—Melvin A. Cartagena
(74) *Attorney, Agent, or Firm*—Dan M. de la Rosa

(57) ABSTRACT

A liquid valve assembly for a toy water gun is provided, the assembly comprising: a conduit being designed to transport liquid therethrough from a liquid source, the conduit comprising an inlet and terminating in a tube, the tube having opposing ends, one of the ends forming a closed tip; and a movable sleeve, the tube being inserted within the sleeve, the sleeve having an outer end, the outer end having a central passage, the sleeve being movable relative to the tube from a first position to a second position, in the first position, the sleeve locates the closed tip and forms a fluid tight connection with the central passage thereby preventing flow of liquid through the central passage, in the second position, the sleeve locates the outer end spaced from the tube thereby permitting flow of liquid through the central passage.

20 Claims, 12 Drawing Sheets

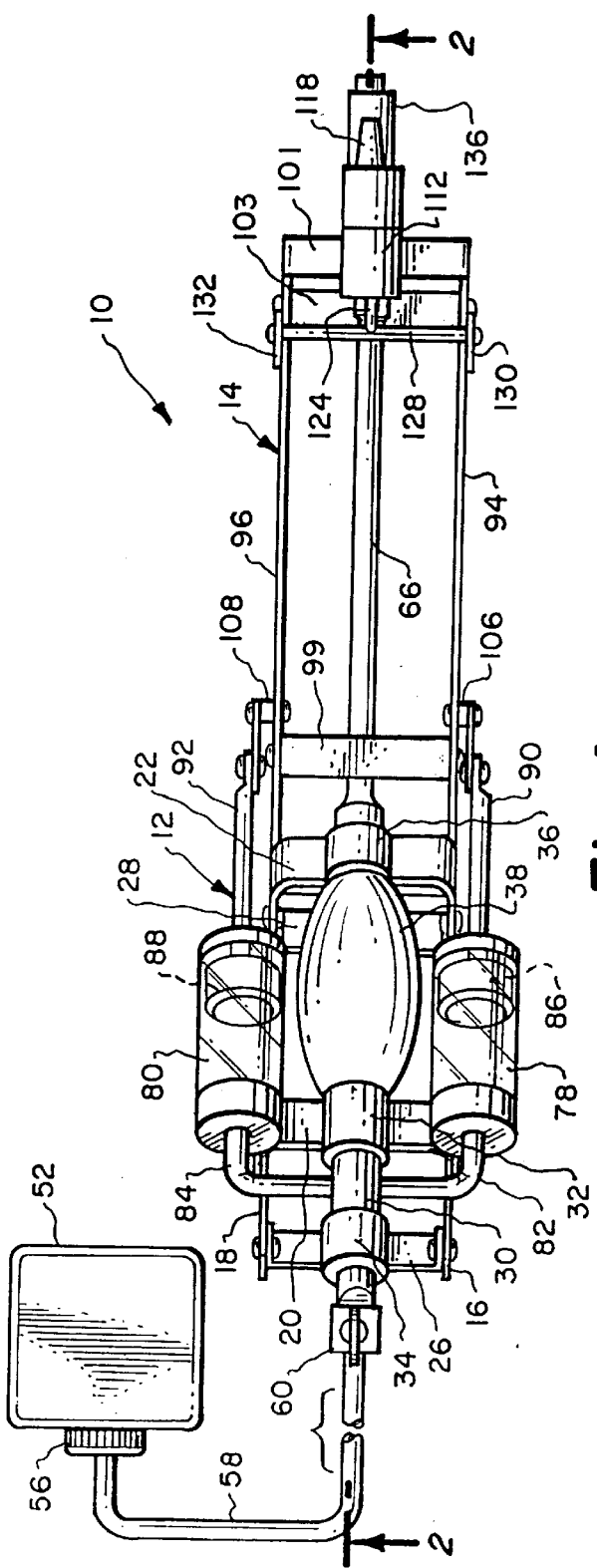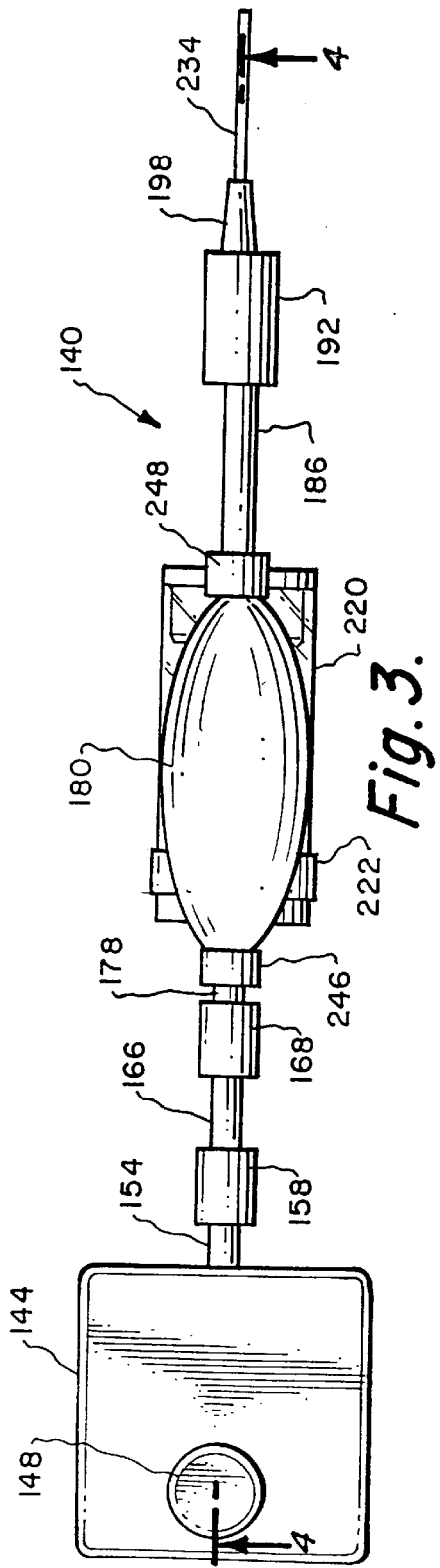

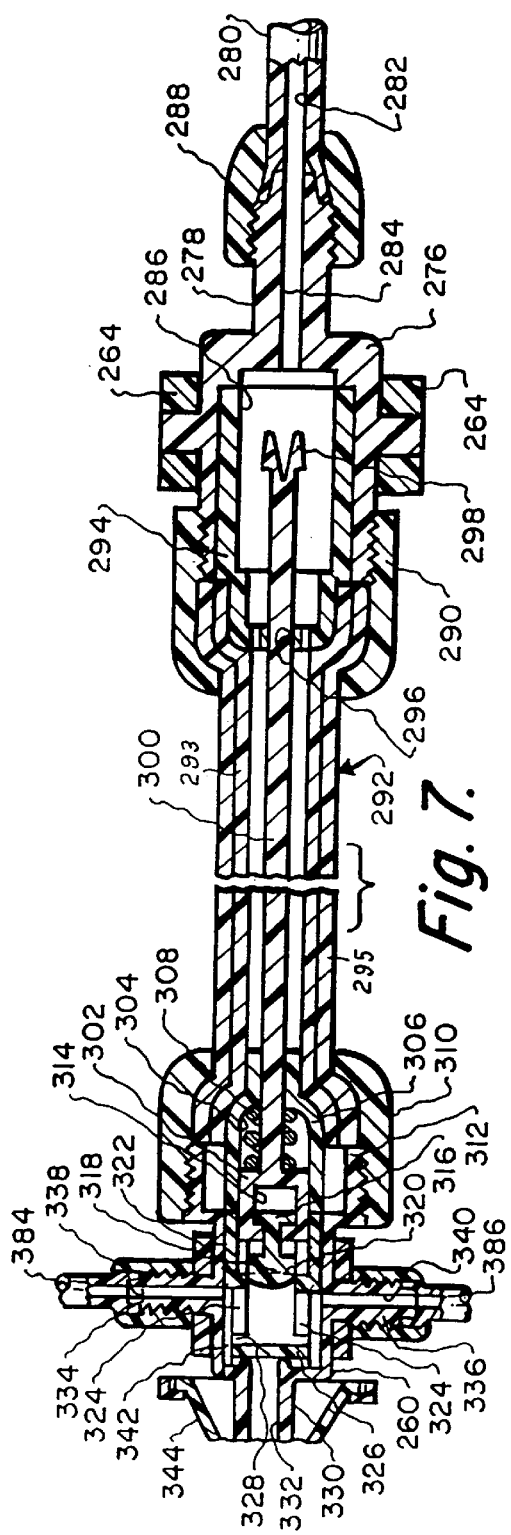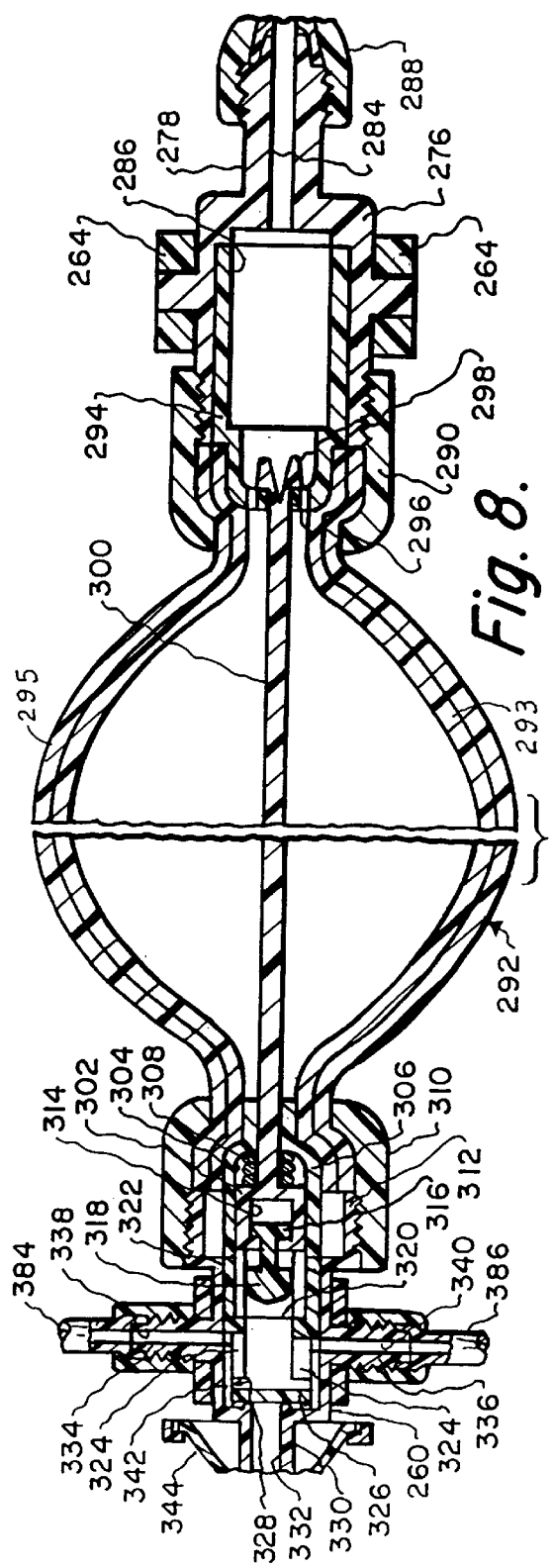

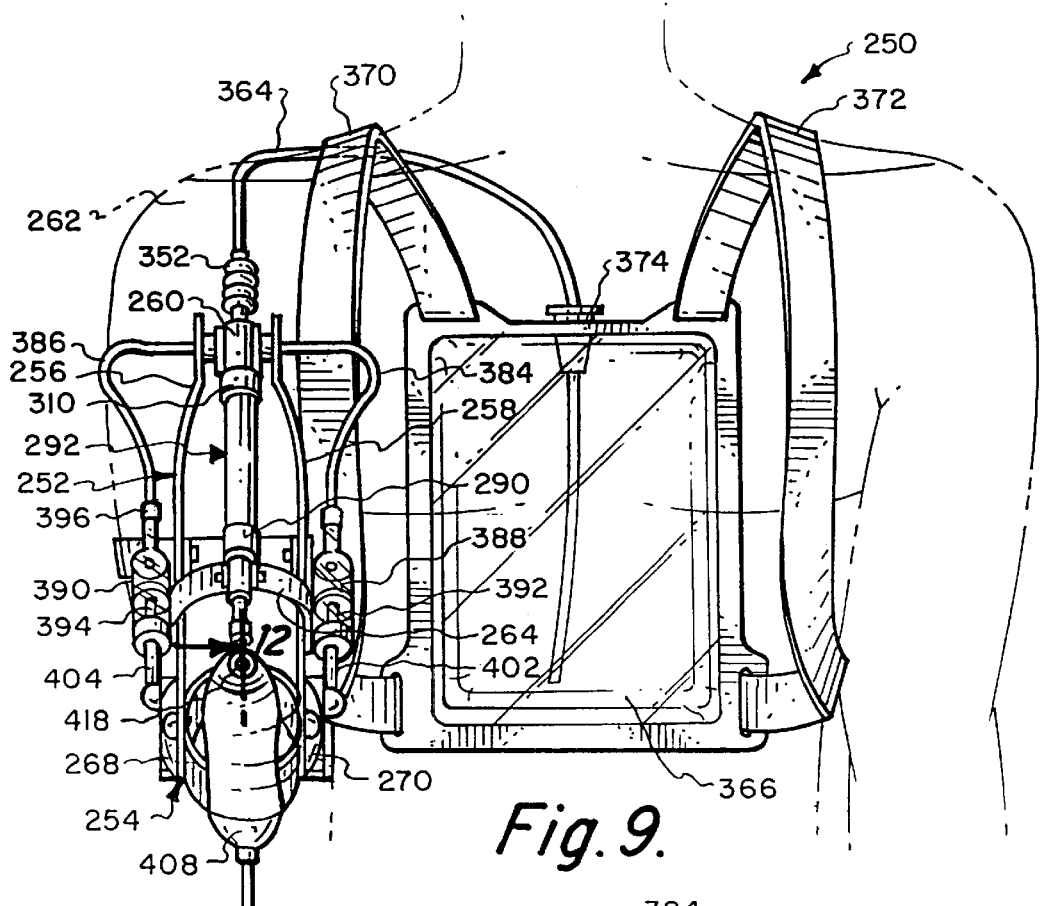
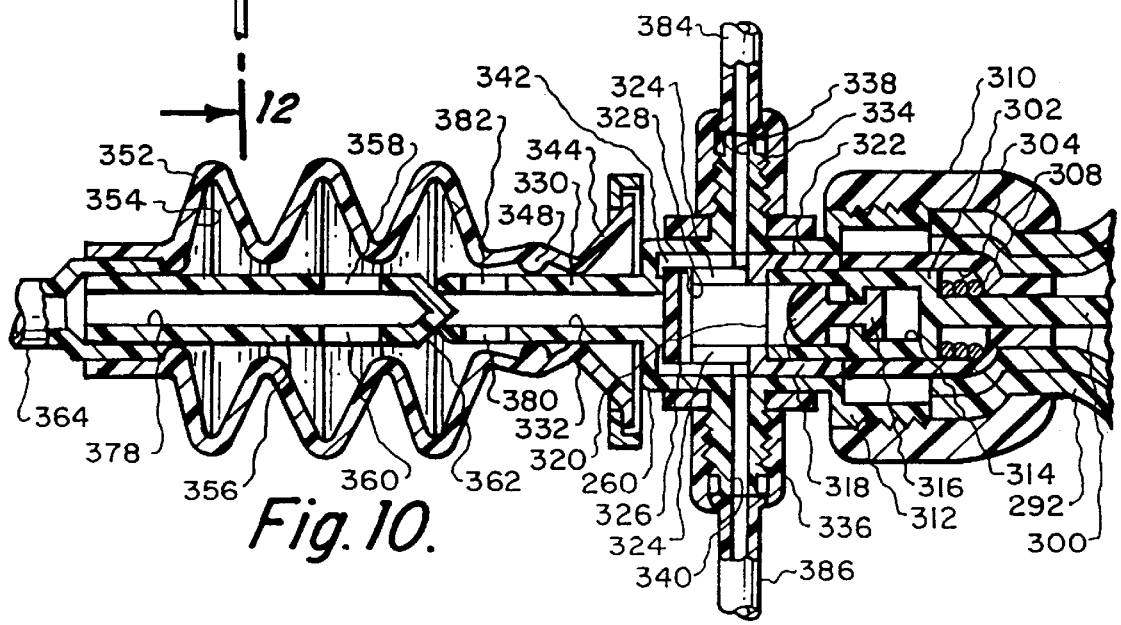

VALVE ASSEMBLY FOR HAND OPERATED WATER GUN

RELATED APPLICATIONS

This application is a divisional application of U.S. patent application Ser. No. 09/526,004 filed Mar. 15, 2000 entitled "Hand Operated Water Gun", which is a continuation-in-part of U.S. patent application Ser. No. 09/296,183 filed Apr. 26, 1999 now abandoned, entitled "Hand Operated Water Gun".

BACKGROUND OF THE INVENTION

1. Field of the Invention

This invention relates to a valve assembly for a toy water gun. More specifically, the present invention relates to a valve assembly in a hand operated water gun for conducting liquid from a liquid source, comprising an inlet conduit terminating in a tube and a movable sleeve surrounding the tube whereby the movement of the sleeve relative to the tube dictates the stoppage and the flow of the liquid through a central passage.

2. Description of the Related Art

Water guns have long been known. The prior art water guns usually include a hollow housing fashioned in the shape of a pistol or rifle. The housing is designed to hold a quantity of water. A trigger on the housing is typically connected to a pump built into the housing. Movement of the trigger causes an amount of water to be forced outwardly through a nozzle that is mounted on or in the housing. However, water guns which utilize a pump type trigger suffer from a drawback in that the power available to expel the water is necessarily less than that which can be supplied by the trigger finger of the user and thus the shooting range and volume of water expelled are quite limited.

To increase the pressure and volume of the water released, it has been proposed that an external energy source could be used, such as a battery or cylinder of compressed gas. Obviously, this would add to the complexity and cost to the water gun and make it less convenient to use and possibly make it unsafe.

A more practical method of increasing volume and range of a water gun has been successfully marketed in which the user can store energy by using a manually operated pump to compress air within a chamber in the water gun. The compressed air can then force a copious quantity of water out the nozzle when a valve is opened by a trigger. One disadvantage of this system is that it is relatively complex, having to deal with compressed air and water. Also, the active compressing of the air requires a large pump, which makes the toy bulky and adds to the cost. Also, in order to build up sufficient pressure, it takes many strokes of the pump, which diminishes the fun of the toy water gun. Furthermore, continued pumping could lead to an unsafe external pressure.

Another way to store energy that has been proposed is to use an elastic bladder, such as an elastic bladder, such as a length of latex rubber tubing, to store pressurized water. This eliminates the need to pressurize air, which is used in the propelling medium. However, there is a problem with the pressurized water being supplied to a latex bladder in that if the bladder is subjected to excessive pressure, it will rupture. This problem of excessive pressure has been addressed by adding a pressure relief valve. In addition, this problem has been resolved with the use of external pressurized water source, such as household tap water, to fill the elastic bladder, which is inconvenient.

SUMMARY OF THE INVENTION

In one embodiment, the present invention relates to a valve assembly adapted for use with a toy water gun. In another embodiment, the valve assembly comprises an inlet conduit for conducting of liquid from a liquid source, the inlet conduit terminating in a tube and the tube having a longitudinal axis and the tube having a free end formed into a closed tip. In still another embodiment, the tube has a sidewall extending to the closed tip and the sidewall has at least one liquid conducting opening. In yet another embodiment, the assembly further comprises a sleeve surrounding the tube and the sleeve is attached to the inlet conduit; the sleeve may be spaced from the tube. In still yet another embodiment, the sleeve terminates at an outer end and the outer end includes a central passage; the sleeve is longitudinally movable relative to the longitudinal center axis from a first position to a second position; the first position locates the closed tip in fluid tight connection with the central passage preventing flow of liquid through the central passage; the second position locates the outer end spaced from said tube permitting flow of liquid through the central passage.

In a further embodiment, the sleeve of the valve assembly of the present invention comprises an elastic bellows, which permits adjusting movement of the sleeve between the first and second positions. In still yet a further embodiment, the central passage of the valve assembly of the present invention comprises an annular ridge secured to the outer end and the annular ridge is in tight connection with the closed tip when the sleeve is in the first position.

In another further embodiment, the present invention relates to a liquid valve assembly in a toy water gun, the assembly comprising: a conduit being designed to transport liquid therethrough from a liquid source, the conduit comprising an inlet and terminating in a tube, the tube having opposing ends, one of the ends forming a closed tip; and a movable sleeve, the tube being inserted within the sleeve, the sleeve having an outer end, the outer end having a central passage, the sleeve being movable relative to the tube from a first position to a second position, in the first position, the sleeve locates the closed tip and forms a fluid tight connection with the central passage thereby preventing flow of liquid through the central passage, in the second position, the sleeve locates the outer end spaced from the tube thereby permitting flow of liquid through the central passage.

In yet another further embodiment, the present invention relates to a method of manufacturing a liquid valve assembly in a toy water gun, the method comprising: providing a conduit being designed to transport liquid therethrough from a liquid source, the conduit comprising an inlet and terminating in a tube, the tube having opposing ends, one of the ends forming a closed tip; inserting the tube within a movable sleeve, the sleeve having an outer end, the outer end having a central passage, the sleeve being movable relative to said tube from a first position to a second position; in the first position, allowing the sleeve to locate the closed tip and form a fluid tight connection with the central passage thereby preventing flow of liquid through the central passage; and in the second position, allowing the sleeve to locate the outer end spaced from the tube thereby permitting flow of liquid through the central passage.

In still yet another further embodiment, the tube has a longitudinal center axis, and the method further comprises allowing the sleeve to longitudinally move relative to the tube parallel to the longitudinal center axis from the first position to the second position. In a further embodiment, the method further comprising providing the sleeve with an elastic bellows which permits adjusting movement of the sleeve between the first position and the second position, and providing the central passage with an annular ridge secured to the outer end, the annular ridge is in tight connection with the closed tip when the sleeve is in the first position.

In another embodiment, the present invention relates to an arm mounted water gun comprising: a water reservoir; a base section designed to be mounted on an upper arm of a user; a pump means and an elastic bladder, the reservoir connecting with the pump means, the pump means being operable to cause flow of water from the reservoir to the elastic bladder to thereby cause the elastic bladder to expand when the volume of water within the elastic bladder exceeds the internal volume of the elastic bladder in its unexpanded state; a movable section attached to the pump means, movement of the movable section causes operation of the pump means, the movable section designed to be mounted on a lower arm of the user, whereby movement of the user's lower arm relative to the upper arm causes activation of the pump means and storage of water within the elastic bladder; a discharge nozzle designed to receive water from the elastic bladder and to dispense water; and a manually operated shut-off valve having a closed position and an open position; in a closed position, the valve prevents flow of water through the discharge nozzle, and in an open position, the valve allows flow of water through the discharge nozzle to thereby allow the gun to dispense water. In still another embodiment, the movable section is attached to the base section and the discharge nozzle is designed to be operated by the hand of the user.

In yet another embodiment, the present invention relates to an arm mounted water gun comprising: a water reservoir; a base section designed to be mounted on an upper arm of a user; a pump means and an elastic bladder, the reservoir connecting with the pump means, the pump means being operable to cause flow of water from the reservoir to the elastic bladder to thereby cause the elastic bladder to expand when the volume of water within the elastic bladder exceeds the internal volume of the elastic bladder in its unexpanded state; a movable section attached to the pump means, movement of the movable section causes operation of the pump means; a discharge nozzle designed to receive water from the bladder and to dispense water; the discharge nozzle being mounted on the movable section; and a manually operated shut-off valve having a closed position and an open position, in a closed position, the valve prevents flow of water through the discharge nozzle, and in an open position, the valve allows flow of water through the discharge nozzle to thereby allow said gun to dispense water.

In still yet another embodiment, the arm mounted water gun of the present invention further comprises a pressure relief valve for preventing over expansion of the elastic bladder. In a further embodiment, the pressure relief valve is connected to the elastic bladder and the gun further comprising a water supply tube, the pressure relief permitting free flow of water between the elastic bladder and the water supply tube by means of a return tube upon the elastic bladder being expanded to its maximum expanded state. In still a further embodiment, the pressure relief valve utilizes the expandable feature of the elastic bladder to hold open a water inlet valve member when the elastic bladder is at its maximum expanded state permitting free flow of water from the elastic bladder to the reservoir to prevent rupture by over expansion of the elastic bladder.

In yet a further embodiment, the present invention relates to a water gun comprising: a water reservoir; a base section connected to the reservoir by a water supply tube; a movable section being pivotally connected to the base section; and a discharge nozzle connected to the movable section by an outlet water tube, whereby pivotal movement of the movable section relative to said base section causes water to be moved from the reservoir through said water supply tube to the movable section and, upon activation of the discharge nozzle, through the outlet water tube and discharged from the discharge nozzle.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 1 is a top plan view of the first embodiment of the water gun of this invention showing the hand operated water gun in its uninstalled position;

FIG. 3 is a top plan view of another embodiment of the hand operated water gun of the present invention;

FIG. 7 is a cross-sectional view through the elastic bladder of another embodiment of the present invention showing the inclusion of the pressure release valve associated in conjunction with the elastic bladder taken along line 7—7 of FIG. 5 showing the elastic bladder I an unexpanded state;

FIG. 8 is a cross-sectional view similar to FIG. 7 specifically showing the elastic bladder in the maximum expanded configuration;

FIG. 9 is a front view of another embodiment of the water gun of the present invention;

FIG. 10 is a cross-sectional view showing the connection between the inlet valve of the elastic bladder with a fill valve that is mounted in conjunction with the reservoir taken along line 10—10 of FIG. 6;

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Figure 2:
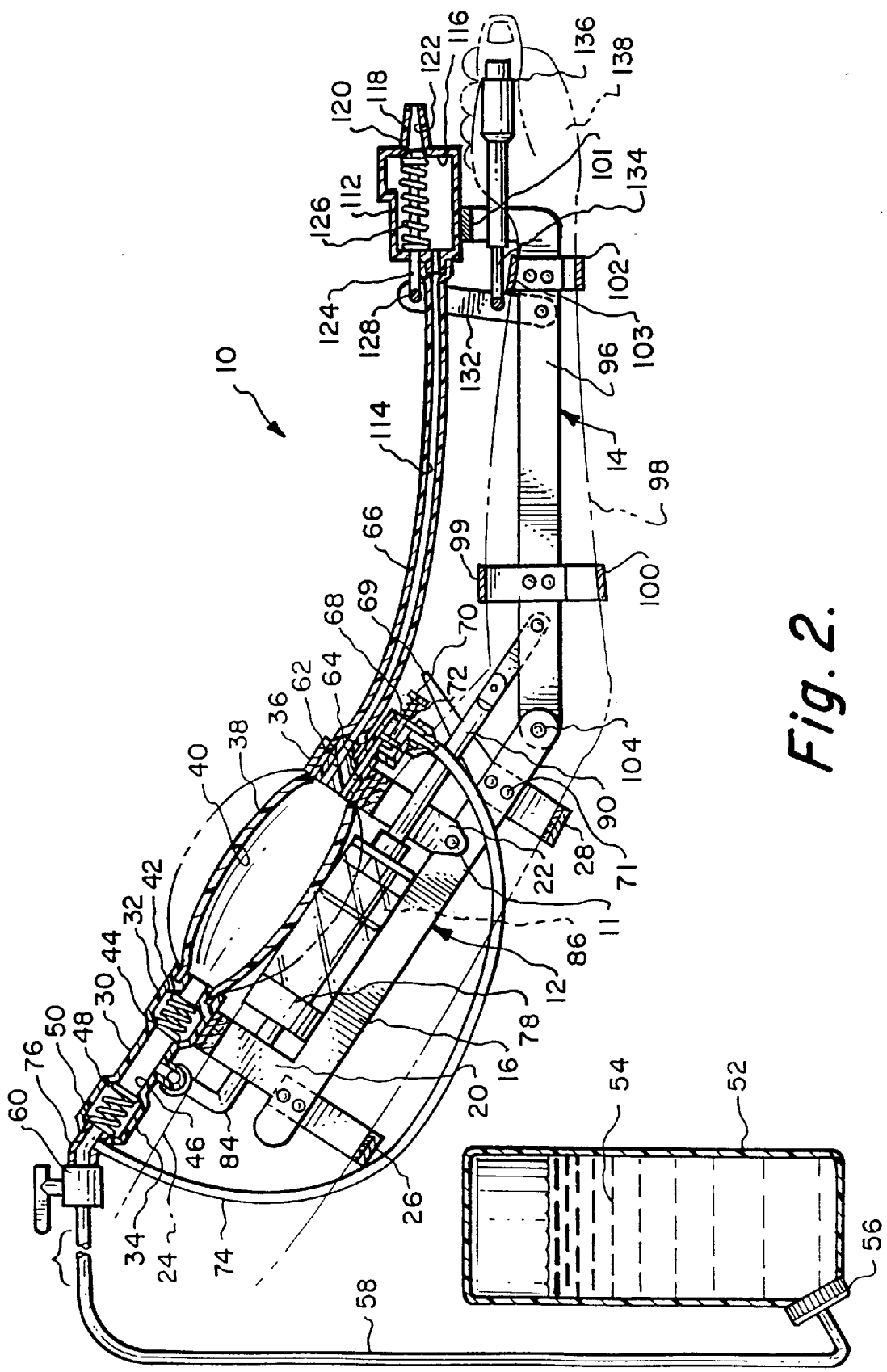
FIG. 2 is a side elevational view taken along line 2—2 of FIG. 1 showing the installation of one of the embodiments of the hand operated water gun of this invention on a user's arm.

Referring particularly to FIGS. 1 and 2 of the drawings, there is shown one embodiment 10 of the present invention. The first embodiment 10 is constructed primarily of a base section 12 and a movable section 14. The base section 12 forms a cradle, which is constructed of a pair of rigid elongated metal or plastic strips 16 and 18, which are connected together by rigid metal or plastic arcuate strips 20 and 22. Strips 16 and 18 are parallel. In between the elongated strips 16 and 18 and against the inside surface of the arcuate strips 20 and 22 is to be located the user's upper arm 24. This cradle formed by the strips 16, 18, 20 and 22, is fixedly mounted on the upper arm 24 by means of fastening straps 26 and 28. These fastening straps 26 and 28 are mounted between the elongated strips 16 and 18 and extend underneath the upper arm 24. These fastening straps 26 and 28 can terminate in a fastening type of connection such is commonly sold under the trade name of Velcro.

Fixedly mounted on the arcuate strip 20 is a tubing 30. Tubing 30 includes an enlarged fore end 32 and an enlarged rear end 34. The enlarged fore end 32 is what is actually fixedly secured to the arcuate strip 20. Fixedly mounted on the strip 22 is a tubing connector 36. Mounted between the tubing connector 36 and the enlarged fore end 32 is an elastic bladder 38. The elastic bladder 38 includes an internal chamber 40.

Inside of the enlarged fore end 32 is a spring 42. The at-rest position of the spring 42 is to force valve plate 44 in a tightly seated position closing off of passage 46 formed within the tubing 30. In a similar manner, contained within the enlarged rear end 34 is a spring 48. The spring 48 exerts a continuous bias against valve plate 5, which closes passage 46.

A reservoir 52 is designed to contain a quantity of water 54. The reservoir 52 has a connector 56. Connecting with the connector 56 is a water supply tube 58. The water supply tube 58 passes through on/off valve 60 and connects with passage 46.

The tubing connector 36 includes an outlet passage 62 and also a pressure relief passage 64. The outlet passage 62 connects with outlet tube 66. The pressure relief passage 64 includes a plunger 70 and a bias spring 72. The return tube 74 is connected to interconnecting tube 76, which connects between the on/off valve 60 and the enlarged rear end 34. The pressure relief valve 68 is mounted on arcuate strip 22, which is pivotally mounted by pivot pin 11 to elongated strip 16. As the elastic bladder 38 expands, it not only gets wider but axially longer. This causes the plunger 70 to pivot toward stop member 69. Stop member 69 comprises a solid member fixed to elongated strip 16 by fasteners 71 and is positioned to be in the path of the movement of plunger 70. When the user makes a pumping action at this time with the elastic bladder 38 fully expanded, the stop member 69 will contact the plunger 70 activating relief valve 68 and releasing some of the water from within the elastic bladder 38 through return tube 74 into interconnecting tube 76. Upon release of a sufficient amount of water from within the internal chamber 40 to cause the elastic bladder 38 to be deflated to a safe level, the plunger 70 is automatically release by counter-clockwise movement of arcuate strip 22, which will prevent the flow of water from internal chamber 40 into return tube 74.

Fixedly mounted onto the elongated strip 16 is a cylinder 78. A similar cylinder 80 is fixedly mounted onto the elongated strip 18. The cylinders 78 and 80 can be constructed of transparent plastic material if such is desired. The internal chamber of the cylinder 78 connects through tube 82 to tubing 30. In a similar manner, the internal chamber of the cylinder 80 connects through tube 84 to the tube 30. Movably mounted within the internal chamber of the cylinder 78 is a piston 86. In a similar manner, piston 88 is movably mounted within the internal chamber of the cylinder 80. The piston 86 is attached to a piston rod 90. In a similar manner, the piston 88 is attached to a piston rod 92. It is to be understood that piston rod 90 is capable of a limited amount of pivoting movement relative to the piston 86. In a similar manner, the piston rod 92 is capable of a limited amount of pivoting movement relative to the piston 88. Piston rod 90 is pivotally attached to elongated strip 96 of the movable section 14. The elongated strips 94 and 96 can either be constructed of rigid metal or plastic material. Also, the strips 94 and 96 are located parallel to each other and are designed to be located on opposite sides of a forearm 98 of the user. Fastening straps 100 and 102 are designed to secure the elongated strips in position on the forearm 98.

The rear end of the elongated strip 94 is connected by a pivot joint 104 to the elongated strip 16. In a similar manner, the elongated strip 96 is connected by pivot joint (not shown) to the elongated strip 18. It is these pivot joints, such as pivot joint 104, that permit the movable section 14 to be pivoted relative to the base section 16. Pivoting of the movable section 14 is in a manner, which is typical of the hinge type movement that is permitted of a forearm 98 relative to an upper arm 24. The piston rod 90 is pivotally attached to elongated strip 94 by the means of a pivot pin 106. A similar pivot pin 108 pivotally connects the piston rod 92 to the elongated strip 96. Adjacent the rear end of elongated strips 94 and 96 is a cross brace 99. Cross brace 99 will rest against the upper surface of the forearm 98.

The fore end of the elongated strips 94 and 96 are joined together by connecting platform 101 and a cross brace 103. Cross brace 103 will also rest on the upper surface of the forearm 98. Mounted on the connecting platform 101 is a discharge valve housing 112. The outlet tube 66 connects with the discharge valve housing 112 with the internal passage 114 of the outlet tube 66 connecting with the internal chamber 116 of the discharge valve housing 112. The discharge valve housing 112 includes a dispensing spout 118. Located within the internal chamber 116 is a valve plug 120, which is normally seated closing off dispensing passage 122 of the dispensing spout 118. Valve plug 120 defines a shut-off valve. The valve plug 120 is connected to a rod 124 with a spring 126 being located about the rod 124. The function of the spring 126 is to exert a continuous bias tending to locate the plug 120 in position to close the dispensing passage 122. The outer end of the rod 124 is integrally connected to a cross rod 128. One end of the cross rod 128 is attached to a link 130 with the opposite end of the cross rod 128 being attached to a link 132. The lower end of the link 130 pivotally connected to the elongated strip 94 with the lower end of the link 132 being pivotally connected to the link 96. Connected between the links 130 and 132 is an actuating rod 134. The outer end of the actuating rod 134 connects to bulbous handle 136. the bulbous handle 136 is positioned to rest within the user's hand 138.

The operation of the first embodiment 10 of this invention is as follows: the on/off valve 60 is located in the open position which permits water to be capable of flowing from the reservoir 52 through water supply tube 58 adjacent the valve plate 50. The movable section 14 may be located in a right-angled position relative to the base section 12. In FIG. 2 of the drawings, the movable section 14 is located in an elongated position relative to the base section. The user then may proceed to move the user's arm 98 to the position shown in FIG. 2. This will cause the pistons 86 and 88 to be moved to the lower end of their respective cylinders 78 and 80. This creates a suction within the cylinders 78 and 80 with this suction being supplied within the passage 46. This suction will cause the valve plate 46 to be unseated which will permit water to flow into passage 46 through tubes 82 and 84 to within the internal chambers of the cylinders 78 and 80. Now, when the movable section 14 is moved in the reverse direction from the elongated position shown in FIG. 2 to a right angled position (which is not shown), the pistons 86 and 88 will force the water through the passage 46 seating valve plate 50 and then unseating valve plate 44 which will then permit the water to flow within the internal chamber 40 of the elastic bladder 38. The elastic bladder 38 will then expand similar to the dotted line position shown in FIG. 2. In one embodiment, it will require approximately one to three pumps by the forearm 98 to result in complete desired expansion of the elastic bladder 38.

With the expansion of the elastic bladder 38 now occurring, the user may then point the dispensing spout 118 in the desired direction of the target and then move rearwardly the bulbous handle 136, which will cause the links 130 and 132 to pivot clockwise, as shown in FIG. 2, which will move rod 124 rearwardly unseating plug 130 from the dispensing passage 122. As a result, the water will be shot in the form of a stream of water from the dispensing passage 122 into the ambient. When it is desired to terminate the expelling of the water in a stream, the user only needs to release the bulbous handle 136 which will result in the valve plug 120 again moving to a position to close dispensing passage 122.

Figure 4:
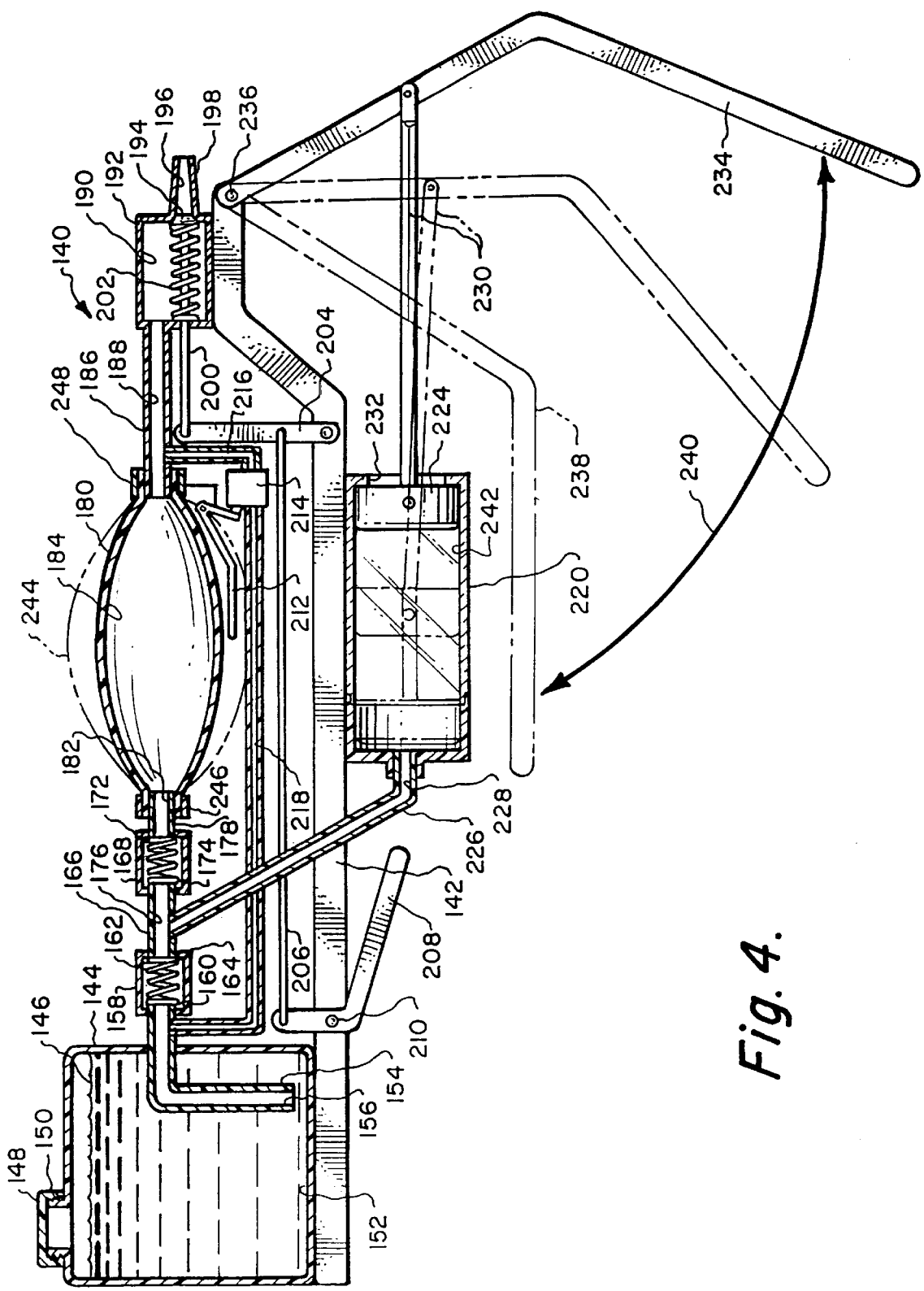
FIG. 4 is a side cross-sectional view taken along line 4—4 of FIG. 3 of another embodiment of the hand operated water gun of the present invention.

Referring particularly to FIGS. 3 and 4 of the drawings, there is shown another embodiment of the present invention. This embodiment 140 includes a rigid base section 142. Fixedly mounted on the aft end of the base section 142 is a reservoir 144. The reservoir 144 is to contain water 146. Supplying of water 146 to within the reservoir 144 is to be accomplished by removing of the cap 148 and pouring of the water 146 through the inlet 150. Extending within the internal chamber 152 of the reservoir 144 and submerged within the water 146 is a tube 154. The tube 154 has a passage 156. The tube 154 extends exteriorly of the reservoir 144 and connects to a valve housing 158. Mounting within the valve housing 158 is a valve plate 160. Valve plate 160 connects with a spring 162, which is located within the internal chamber 164 of the valve housing 158. It is the function of the spring 162 to normally locate the valve plate 160 to close off passage 156.

Valve housing 158 connects to an interconnecting tube 166. Interconnecting tube 166 connects to a second valve housing 168. Included within the second valve housing 168 is an internal chamber 170. Located within the internal chamber 170 is a spring 172 and a valve plate 174. Valve plate 174 functions to close off the passage 176 of the interconnecting tube 166.

Internal chamber 170 connects with a short tube 178. The short tube 178 is attached to one end of an elastic bladder 180. The internal passage 182 of the short tube 178 connects with the internal chamber 184 of the elastic bladder 180. The opposite end of the elastic bladder 180 is mounted to an outlet tube 186. The open ends of the elastic bladder 180 are secured as by clamping band 246 to short tube 178 and by clamping band 248 to the outlet tube 186. The outlet tube 186 has an internal passage 188, which connects with the internal chamber 184. The passage 188 also connects with internal chamber 190 located within a discharge valve housing 192. Located within the discharge valve housing 192 is a plug 194, which is located to close off spout passage 196 of a dispensing spout 198. The plug 194 is attached to a rod 200, which extends exteriorly of the internal chamber 190. Within the internal chamber 190 and located about the rod 200 is a spring 202. The function of the spring 202 is to maintain a continuous bias against the plug 194 tending to have it be seated so as to close off the spout passage 196.

The rod 200 is pivotally connected to a link 204 with one end of the link 204 being pivotally mounted on the base section 142. Also connecting with the link 204 in a pivotally connected manner is an actuating link 206. The link 206 is also pivotally connected to the inner end of a lever 208. The lever 208 is also pivotally mounted by means of a pivot pin 210 to the base section 142.

Positioned directly adjacent the elastic bladder 180 is an actuating lever 212. This actuating lever 212 is connected to a pressure relief valve (not shown), which is located within the pressure relief valve housing 214. Tube 216 connects between outlet tube 186 and pressure relief valve housing 214. A return tube 218 connects between the pressure relief valve housing 214 and tube 154.

A cylinder 220 is fixedly mounted by strap 222 to the base section 142. Movably mounted within the cylinder 220 is a piston 224. The outer end of the cylinder 220 connects by way of a tube 226 to the interconnecting tube 166. The tube 226 contains an internal passage 228.

Piston 224 is pivotally connected to a piston rod 230. The piston rod 230 extends exteriorly of the cylinder 220 through enlarged opening 232 and connects with handle 234. The inner end of the handle 234 is pivotally connected by pivot pin 236 to the base section 142.

The operation of this second embodiment 140 of the invention is as follows: The handle 234 may be grasped by one hand of the user with the opposite hand of the user holds onto the base section 142. The handle 234 is in the retracted position 238, which is shown in dotted lines. In this position, the piston 224 is located directly adjacent the passage 228. As the user proceeds to move the handle 234 from the dotted line position 238 in the direction of arrow 230 to the solid line position shown in FIG. 4. While this occurs, water 146 is being sucked from the internal chamber 152, through the passage 156, unseating valve plate 160 and flows into the internal chamber 164. From the internal chamber 164, the water is conducted into the passage 176, down the passage 228 to within the internal chamber 242 of the cylinder 220. From the solid line position, the handle 234 is then moved back to the retracted position, shown in dotted line at 238. This will cause the water contained within the internal chamber 242 to be moved through the passage 228, through the passage 176, unseating of valve plate 174 and compressing the spring 172, to within the internal chamber 170. From the internal chamber 170, the water will flow through passage 182 to within the internal chamber 184 of the elastic bladder 180. Because at this time there is no outlet for the water from the internal chamber 244 shown in FIG. 4 of the drawings.

It is to be noted that this second embodiment 140 utilizes only a single piston 24 and a single cylinder 220 which means there may be required a greater number of pumping movements by the user's hand in order to achieve the desired inflation of the elastic bladder 180. If, per chance, the elastic bladder 180 becomes over inflated, it will automatically press against actuating lever 212 which will open relief valve (not shown) contained within the pressure relief valve housing 214, which will cause water to be conducted from passage 188, through the tube 216 and through tube 218 into passage 156 of the tube 154. This will cause the elastic bladder 180 to partially deflate, and upon a desired level of deflation being achieved, the actuating lever 212 will automatically be moved so that the pressure relief valve (not shown) contained within the pressure relief valve housing 214 to be closed not permitting the conducting of water from the passage 188 into passage 176.

When the user presses on lever 208, the actuating link 206 is moved linearly and the link 204 is pivoted. The pivoting of link 204 will cause linear movement of the rod 200 which will unseat plug 194 from the spout passage 196. This will cause water to be ejected from the spout passage 196 into the ambient. When such dispensing of the water has occurred from the spout passage 196, the lever 208 is released which will cause the plug 194 to be again seated closing off the spout passage 196 and the user can then, again, manually move the handle 234 between the solid line position and the dotted line position 238, shown in FIG. 4, to achieve reinflating of the elastic bladder 180 with water.

Figure 5:
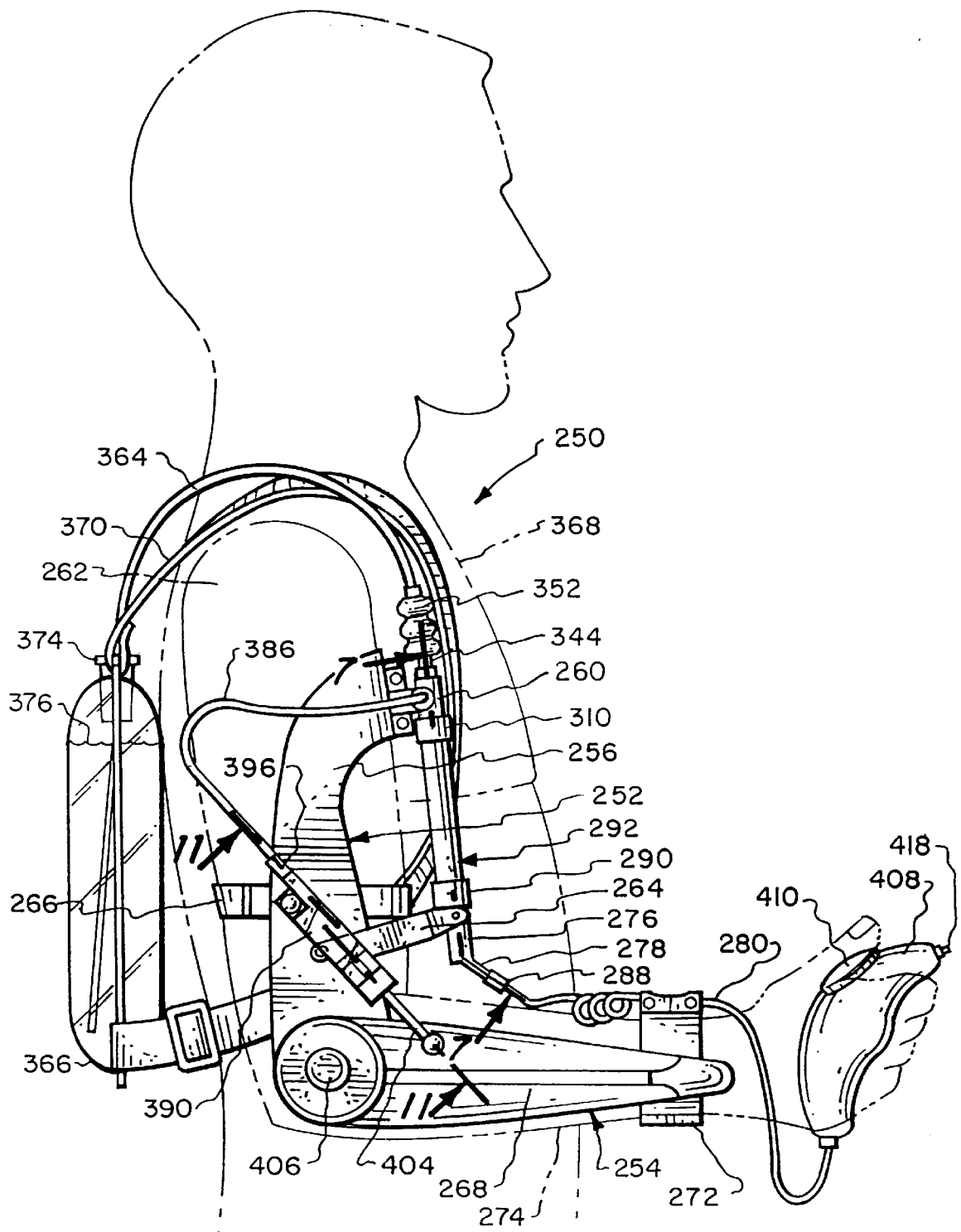
FIG. 5 is a side elevation view of still another embodiment of the water gun in the normal position of discharging a stream of water.
Figure 6:
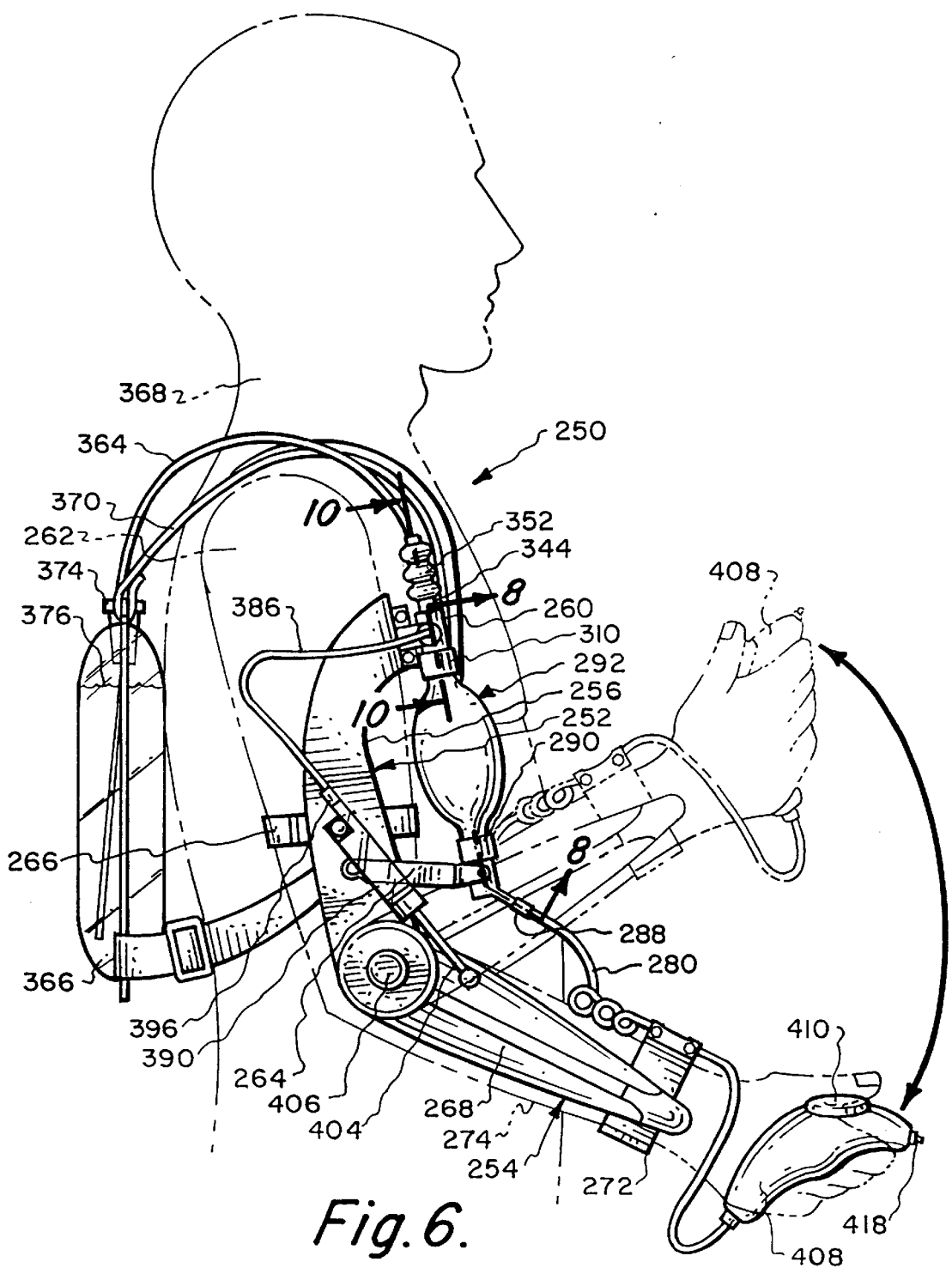
FIG. 6 is a view similar to FIG. 5, specifically depicting movement of the user's arm in order to pump liquid into the elastic bladder.

Referring particularly to FIGS. 5, 6 and 9 of the drawings, there is shown still yet another embodiment 250 of the water gun of the present invention. This embodiment 250 includes a base section 252 and a movable section 254. The base section 252 has a pair of main arms 256 and 258. One main arm 256 is fixedly mounted on one side of a valve housing 260 with the other main arm 258 being mounted on the diametrically opposite side of the valve housing 260. The user's arm 262 is mounted in between the main arms 256 and 258. A U-shaped bracket 264 is also secured between the main arms 256 and 258 with the user's arm 262 to be located within the area confined by the bracket 264. Mounted against the backside of the user's arm is a strap assembly 266. The strap assembly 266 may be disengageable so as to permit disconnection of the base section 252 from the user's arm 262. The function of the strap assembly 266 is to securely mount the base section 252 onto the user's arm 262.

Pivotally mounted on the portion of the main arm 256 that is furthest from its connection with the valve housing 260 is the main arm member 268 of the movable section 254. A similar arm member 270 is pivotally mounted in a similar position onto the main arm 258. The arm members 268 and 270 are connected together by wrist strap 272. The wrist strap 272 is comprised of a pair of strap members, which are connected together and are to be located around the wrist of the user's forearm 274.

Referring particularly to FIGS. 7 and 8, mounted on U-shaped bracket 264 is a valve outer housing 276. The valve outer housing 276 includes a stem 278, which is to be connected to a flexible tube 280. Within the flexible tube 280 is a liquid conducting passage 282. The passage 282 connects with the passage 284 formed within the stem 278. The passage 284 connects with the internal chamber 286 of the valve outer housing 276. The flexible tube 280 is fixedly mounted by a securing sleeve 288 to the stem 278. The valve outer housing 276 is threadably secured t cap 290. The cap 290 functions to mount one end of a tubular elastic bladder 292 to the valve outer housing 276.

The tubular elastic bladder 292 is constructed of an inner bladder 293 and an outer bladder 295 which are mounted so their longitudinal central axes coincide. The inner bladder 293 is mounted within outer bladder 295 with the bladders 293 and 295 abutting. Expansion of bladder 292 produces simultaneous expansion of bladders 293 and 295. If a rupture occurs of bladder 293, bladder 295 will still function and vice versa. This is a safety feature to insure that operation of the water gun will continue.

Mounted within the internal chamber 286 is an inner housing 294. The inner housing 294 has a hole 296. Mounted within the hole 296 and locatable within the internal chamber 286 is barb end 298 of the valve stem 300. Relative movement I possible between the valve stem 300 and the inner housing 294, and when the elastic bladder 292 is expanded to the maximum configuration, the barb end 298 will abut against the inner housing 294 as is clearly shown in FIG. 8 of the drawings. When the elastic bladder 292 is in anything other than the maximum expanded configuration, the barb end 298 will be located deep within the internal chamber 286, as is clearly shown in FIG. 7 of the drawings.

The valve stem 300 is connected to a box end 302. The box end 302 is slidably mounted within chamber 304 of the entrance housing 306. Located about the valve stem 300 is a coil spring 308, one end of which is to abut against the entrance housing 306 and the opposite end of which abuts against the box end 302. A cap 310 is to be secured to a threaded section of a valve inner housing 312 with the cap 310 functioning to securely mount the inner end of the elastic bladder 292 onto the entrance housing 306.

The box end 302 includes an internal chamber 314 within which is movably mounted the aft end 316 of a headed valve member 318. The headed valve member 318 is capable of seating against seat 320 of the retainer 322. The entrance housing 306 is mounted within valve housing 260. The entrance housing 306 includes a plurality of annularly spaced-apart ribs 324. One end of the retainer 322 abuts against the ribs 324. Mounted within the valve housing 260 is a valve disk 326. The valve disk 326 is movable a limited amount within the chamber 328. The valve disk 326 will normally be constructed of a resilient material such as a rubber or plastic.

The valve housing 260 includes a forward tube 330, which includes a through passage 332. The valve housing 260 also includes tube connectors 334 and 336. The tube connector 334 has a through passage 338 and the tube connector 336 has a through passage 340. Formed on the inside surface of the valve housing 260 are a plurality of ribs 342. The ribs 342 and 324 cooperate to form the chamber 328 within which is located the valve disk 326.

Figure 13:
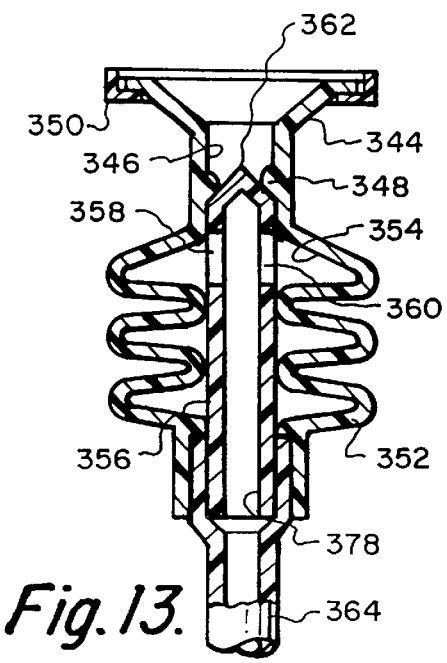
FIG. 13 is an isometric view of the fill valve that is shown in FIG. 10 emphasizing the fill valve in the closed position preventing flow of liquid from the reservoir.

Referring particularly to FIGS. 10 and 13, the forward tube 330 is to be insertable within a conical connector 344. The conical connector 344 has a central passage 346. Formed within the central passage 346 and integral with the wall of the central passage 346 is an annular rib 348. The free peripheral edge of the conical connector 344 is attached to a hard ring 350. It is to be understood that the hard ring 350, as well as most of the structural items making up the water gun of this invention, is to be constructed of plastic. The function of the hard ring 350 is to maintain the established shape of the conical connector 344 since the conical connector 344 is to be constructed of an elastomeric material.

The conical connector 344 is integral with bellows 352. The bellows 352 has an internal chamber 354. A rigid tube 356, constructed of hard plastic, is to be located within the internal chamber 354. The rigid tube 356 has a pair of holes 358 and 360 formed within its sidewall. The rigid tube 356 terminates in its outer end at a pointed closed end 362. The aft end of the rigid tube 356 is fixedly secured to inlet tube 364 and also the aft end of the bellows 352. the inlet tube 364 connects to reservoir 366.

The reservoir 366 constitutes a flexible walled bag, which is to be worn on the back of the user 368. The reservoir 366 is maintained in that position by straps 370 and 372. The inlet tube 364 is held in position relative to the reservoir 366 by means of a cap 374, which is mounted within the fill opening of the reservoir 366. Water 376, that is contained within the reservoir 366, is to be sucked through the inlet tube 364 through the internal passage 378 and be dispensed through the holes 358 and 360 into the internal chamber 354. From the internal chamber 354 the water is to flow through holes 380 and 382 of the forward tube 330 and into the through passage 332. The conical connector 344 is mounted on the exterior surface of the forward tube 330 with the annular rib 348 forming a fluid tight connection with the forward tube 330. The water is to then flow into contact with the valve disc 326 displacing such rearwardly which will permit the water to flow past the valve disk 326, alongside of the ribs 324 and 342 to within the chamber 328. This water will then be caused to move within the through passages 338 and 340 with through passage 338 connecting with tubing 384 and through passage 340 connecting with tubing 386. When the conical connector 344 is installed on the forward tube 330, the pointed portion of the closed end 362 is inserted within the through passage 332 forming a connection between the rigid tube 356 and the forward tube 330.

Figure 11:
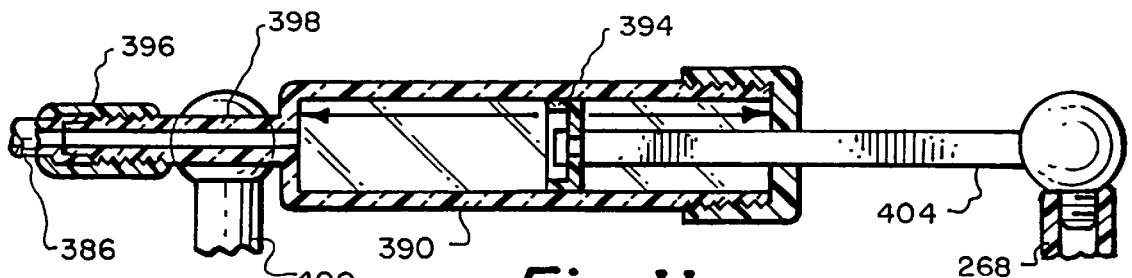
FIG. 11 is a cross-sectional view through one of the pistons that is utilized in conjunction with the pumping apparatus included within another embodiment of the water gun taken along line 11—11 of FIG. 5.

Referring particularly to FIG. 11, the tubing 384 connects to a cylinder 388. The cylinder 388 is mounted on the main arm 258. In a similar manner, the tubing 386 connects to a cylinder 390. The cylinder 390 is fixedly mounted to the main arm 256. Movably mounted within the cylinder 388 is a piston 392 with there being a piston 394 mounted within cylinder 390. The piston 394 is connected by piston rod 404 to arm member 270. The tubing 386 is connected by a connector 396 to rigid tube 398 which is connected to the cylinder 390. The rigid tube 398 is secured to the main arm 256.

Figure 14:
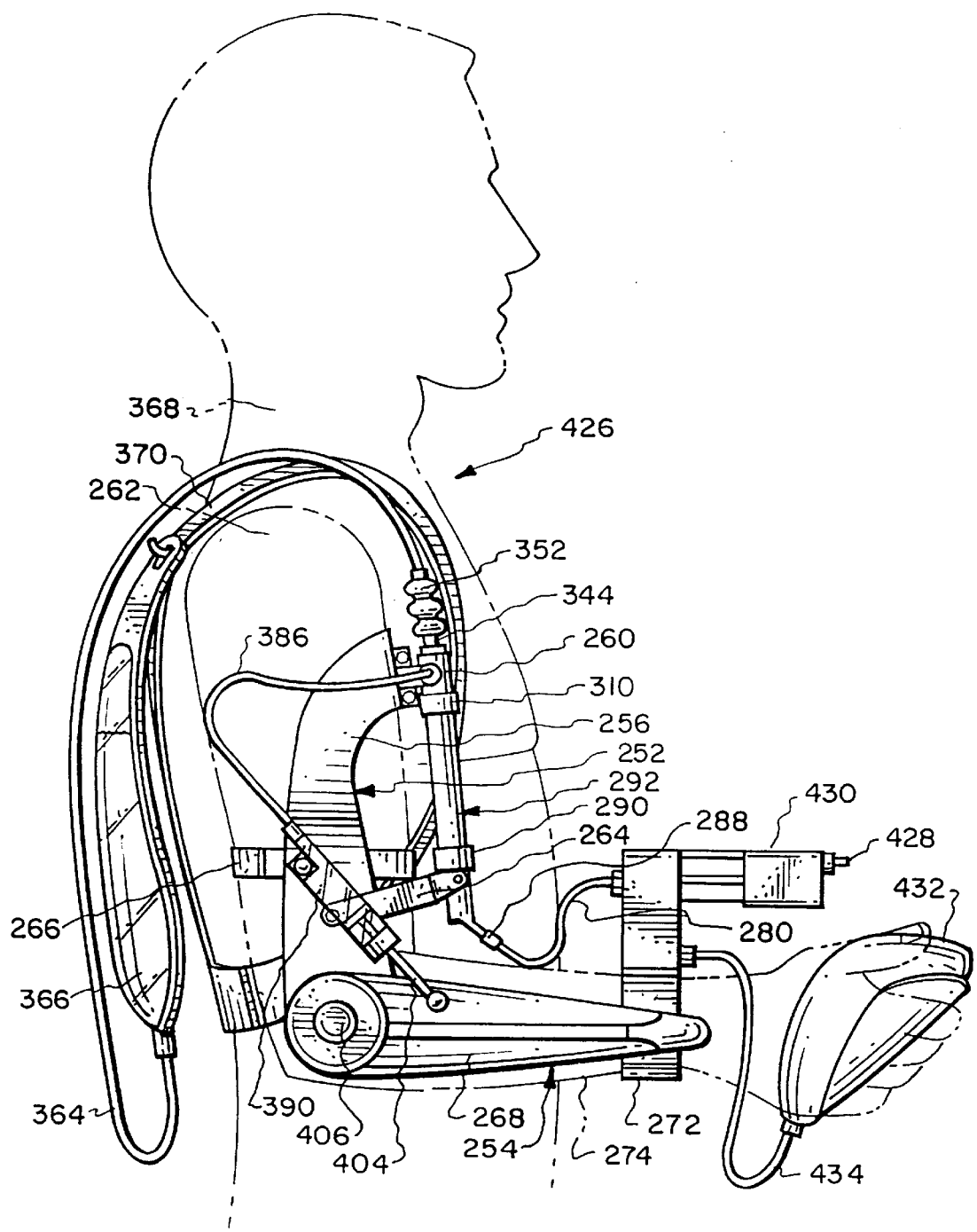
FIG. 14 is a side elevational view of yet another embodiment of the water gun of the present invention where the discharge nozzle is not hand held but is mounted on a movable section of the water gun structure.

The reservoir 366, in FIG. 14, is a bottom dispensing bag that does not include a tube that extends within the confines of the bag. The water is dispensed from the bag by gravity from the lower edge of the reservoir 366 in FIG. 14, which is different from the reservoir 366 in FIGS. 5, 6 and 9 where the water 376 is dispensed from the top edge of the reservoir 366.

Figure 12:
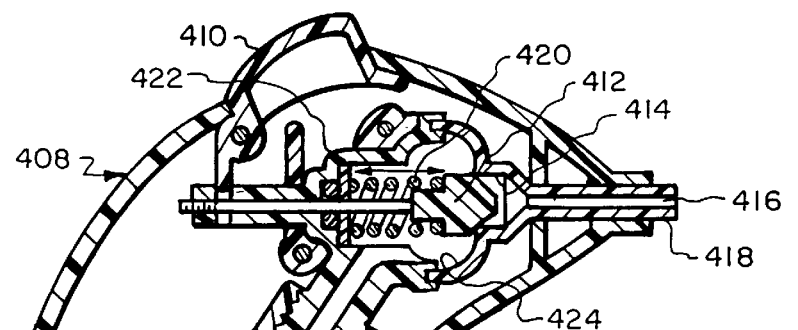
FIG. 12 is a cross-sectional view through the hand held trigger and discharge nozzle, which is utilized in conjunction with the other embodiment of this invention taken along line 12—12 of FIG. 9.

Arm member 268 is mounted by pivot joint 406 to the main arm 256. In a similar manner, the main arm 258 is pivotally mounted to the arm member 270. The pivot joints, such as 406, permit the arm members 268 and 270 to be extended to an obtuse angle relative to the main arms 256 and 258. The obtuse angle is shown in solid line position in FIG. 6. With the movable section 254, which is composed of main arms 256 and 258 in the obtuse position shown in FIG. 6, the pistons 392 and 394 are located within the lower end of their respective cylinders 388 and 390. This has caused a sucking action to occur and water 376 is drawn from the reservoir 366 through the elastic bellows 352 and through the tubing 384 and 386 to within the cylinders 388 and 390. Now when the user's forearm 274 begins to move toward the acute angle position shown in dotted lines in FIG. 6, the pistons 392 and 394 proceed to move toward the upper end of their respective cylinders 388 and 390. This will cause water contained within the cylinders 388 and 390 to be moved forcefully under pressure to within chamber 328. This water under pressure will cause valve disk 326 to be seated closing off through passage 332. This water will then flow around the headed valve member 318 around the box end 302 to within the elastic bladder 292. Water 376 then flows into internal chamber 386 and out through passage 284 and into flexible tube 280. Water is not discharged from flexible tube 280 when hand held trigger valve assembly 408 is closed which is shown primarily in FIG. 12. As a result, the elastic bladder 292 will expand, and when finally the elastic bladder 292 is expanded to the maximum configuration shown in FIG. 8, the barb end 298 will come in contact with the inner housing 294.

As the elastic bladder 292 continues to expand just slightly, the valve stem 300 will cause the headed valve member 318 to be held in the open position, compressing coil spring 308, permitting flow of water 376 between the tubing 384 and 386 and the elastic bladder 292. With the elastic bladder 292 in the maximum expanded configuration of FIG. 8, and let it be assumed that the user 368 continues to exert a pumping action by moving of the user's forearm back and forth between the obtuse angular position, that the water 376 is being merely sucked from within the elastic bladder 292 and then pumped back into the elastic bladder 292 by the pistons 392 and 394. No new water 376 is being conducted from the reservoir 366. Therefore, the elastic bladder 292 does not further expand.

When the user 368 presses button 410 on the trigger valve assembly 408, valve member 412 is moved away from seat 414 of the discharge passage 416 mounted within the discharge nozzle 418. The valve member 412 is moved against the action of a coil spring 420, which is mounted within the discharge valve housing 422. The water 376 is caused to flow from the passage 282 of the flexible tube 280 into the internal chamber 424, through discharge passage 416 to be discharged in the form of a stream of water from the discharge nozzle 418. This will cause the internal volume and therefore the length of the elastic bladder 292 to decrease so that the barbed end 298 is now moved away from the inner housing 294 allowing coil spring 308 to push headed valve member 318 to a position which seats against seat 320 preventing the flow of water 376 from the elastic bladder 292 and into chamber 328. When the user's forearm 274 is moved from the dotted fine position in FIG. 6 to the solid line position shown in FIG. 6, the pistons 392 and 394 will suck water from the reservoir 366 with this water not flowing into the elastic bladder 292 at this time because the pressure in the cylinders 388 and 390 is less than that in the elastic bladder 292. Therefore, this water flows into the cylinders 388 and 390. When the user's forearm 274 moves from the dotted fine position to the solid line position shown in FIG. 6, the water is forced from the cylinders 388 and 390 into the elastic bladder 292, and when the cylinders 388 and 390 are substantially empty of water and the user's forearm 274 is again in the dotted line position shown in FIG. 6, the headed valve member 318 will again move to the seated position assuming that the elastic bladder 292 is not in the fully expanded configuration. Therefore, as the user's forearm 274 again moves from the dotted line position to the solid line position shown in FIG. 6, more water 376 will be drawn from the reservoir 366 displacing valve disk 326 and again filling the cylinders 388 and 390. As the user's forearm 274 now moves again to the dotted line position in FIG. 6, the water that is contained within the cylinders again will be forced into the elastic bladder 292. However, once the elastic bladder 292 is in the maximum expanded position as shown in FIG. 8, because the barb end 298 is placed in contact with the inner housing 294, the valve stem 300 will position the headed valve member 318 in the continuously open position permitting free flow between the elastic bladder 292 and the cylinder 388 and 390. This functions as a pressure relief device preventing over expansion of the elastic bladder 292 and rupture of such.

When the user 368 is not utilizing the third embodiment of the invention, the reservoir 366 with straps 370 and 372 can be separated from the base section 252 by physically disengaging conical connector 344 from the forward tube 330. Immediately, the elastic bellows 352 will retract until the closed end 362 comes into tight abutting and fluid tight connection with the annular rib 348. This will now prevent any water leaking from the reservoir 366. When the user 368 desires to refill the reservoir 366, it is only necessary to insert the outer end of the garden hose, which is not shown, or a faucet, which is also not shown, to within the outer portion of the connector 344 connecting with the outer portion of the connector 344 connecting with the central passage 346. The pressure of the water from this source will unseat the closed end 362 from the annular rib 348 and expand somewhat the bellows 352. This will permit water to flow from the source to within the reservoir 366 refilling such.

Referring particularly to FIG. 14, there is shown a further embodiment 426 of the resent invention with like numbers being utilized to refer to like parts. The main difference between this fourth embodiment 426 and the third embodiment 250 is that the discharge nozzle 428, which connects to the flexible tubing 280 in the fourth embodiment 426, is mounted on bracket 430. The bracket 430 is fixedly mounted on the movable section 254. Dispensing of the water through the discharge nozzle 428 is to be accomplished by a hand held trigger unit 432, which operates a valve (not shown) associated with the discharge nozzle 428 by means of a flexible cable 434.

Instead of using flexible bag type of reservoir 366, there may be used a different form of solid wall reservoir which is shown as reservoirs 52 and 144. FIGS. 15–21 are directed to different configurations of solid wall reservoirs that could be utilized in conjunction with the water gun of the present invention.

Figure 15:
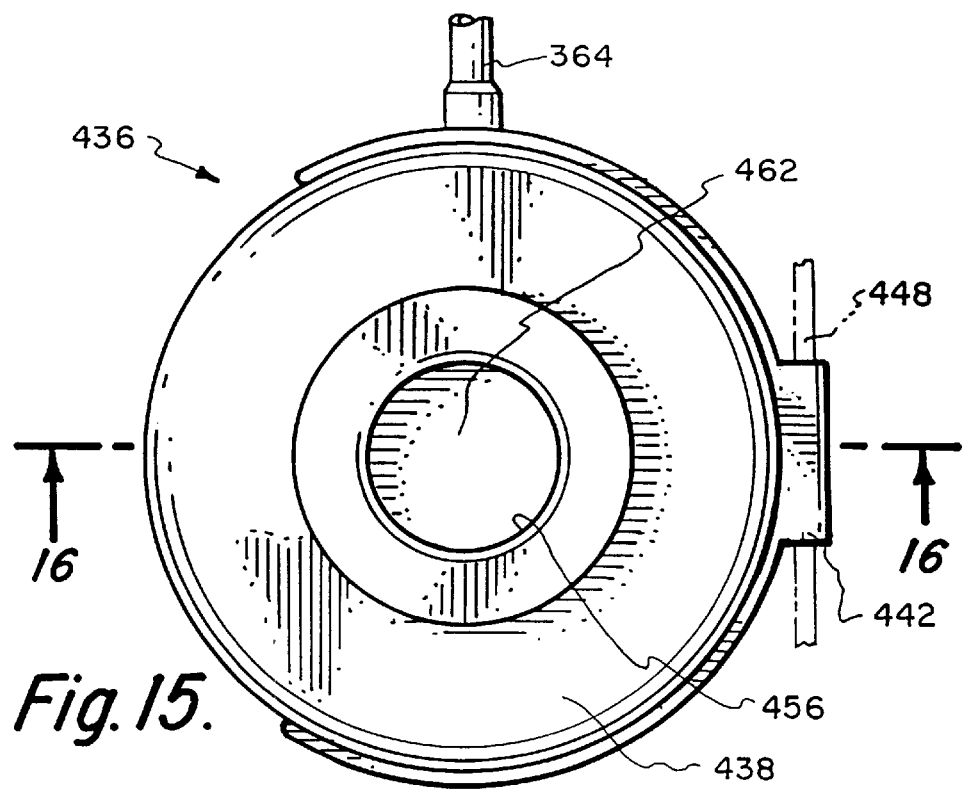
FIG. 15 is a top view of a configuration of the reservoir of the present invention that can be used in conjunction with the water gun of the present invention.
Figure 16:
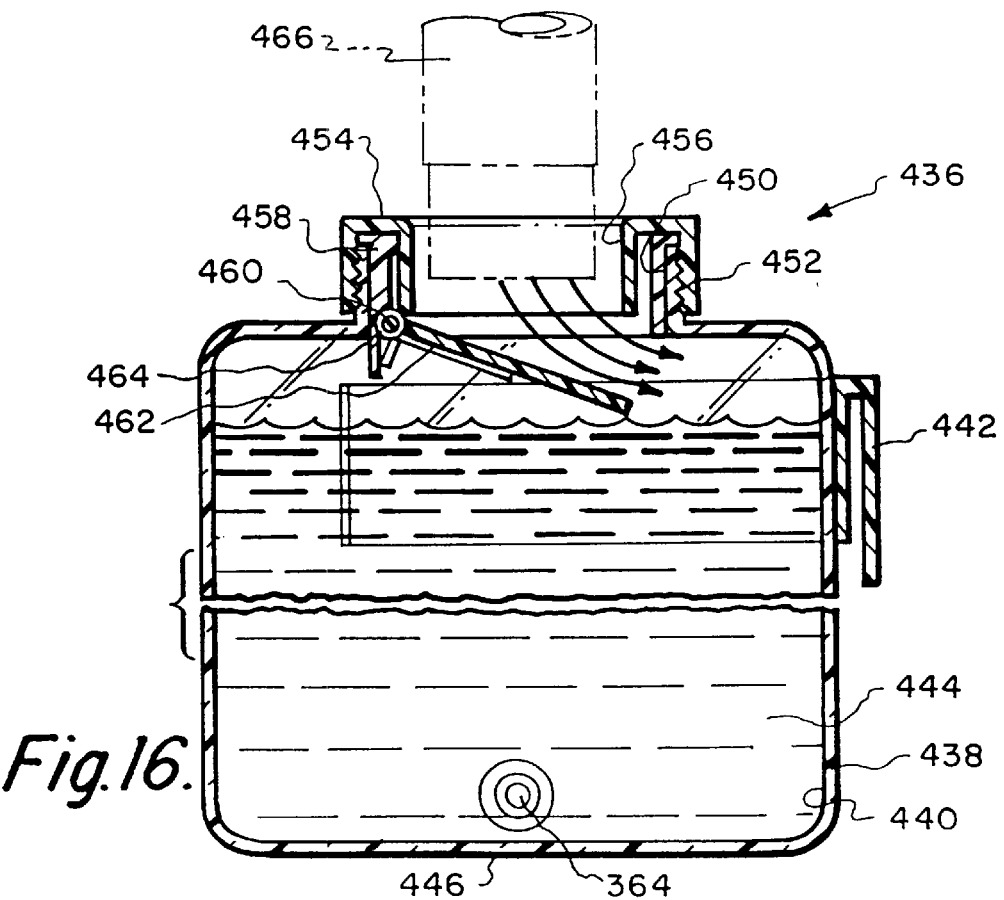
FIG. 16 is a cross-sectional view taken along line 16—16 of FIG. 15 showing one embodiment of the valve plate that is mounted in conjunction with the reservoir in a displaced position permitting entry of liquid from a source into the internal chamber of the reservoir.

Referring particularly to FIGS. 15 and 16, there is shown embodiment 436 of the reservoir, which has a solid body 438, and may be constructed of plastic. Within the solid body 438 is an internal chamber 440. Mounted on the solid body 438 is a clip 442 that facilitates mounting by a strap 448 on the clothing of the user 368. Water 444 is to be located within the internal chamber 440. The inlet tube 364 is to connect with the solid body 438 directly adjacent the bottom 446 of the solid body 438. Therefore, the water 444 is to flow by gravity to within the inlet tube 364 and then to the bellows 352.

Formed within the solid body 438 is a fill opening 450. Surrounding the fill opening 450 is an externally threaded connector 452. A cap 454 is to be threadably mounted on the externally threaded connector 452. The cap 454 defines a fill opening 456. Mounted to the cap 454 is a mounting flange 458. The mounting flange 458 is located within the internal chamber 440. Pivotally mounted by pivot pin 460 onto the mounting flange 458 is a valve plate 462. The valve plate 462 is under a continuous spring bias by a spring 464, which tends to locate the valve plate 462 in abutting contact with the inner edge of the cap 454, which closes the fill opening 456. Therefore, the natural position of the valve plate 462 is to keep water 444 from spilling from the reservoir composed of the solid body 438. However, upon insertion of the free end of a faucet or garden hose 466 to within the fill opening 456, the force of the water being ejected therefrom will cause the valve plate 462 to deflect permitting the water 444 to flow within the internal chamber 440 filling such. Once the faucet or garden hose 466 is removed from the fill opening 456, the bias of the spring 464 will automatically close the valve plate 462 against the cap 454 closing of the fill opening 456.

Figure 17:
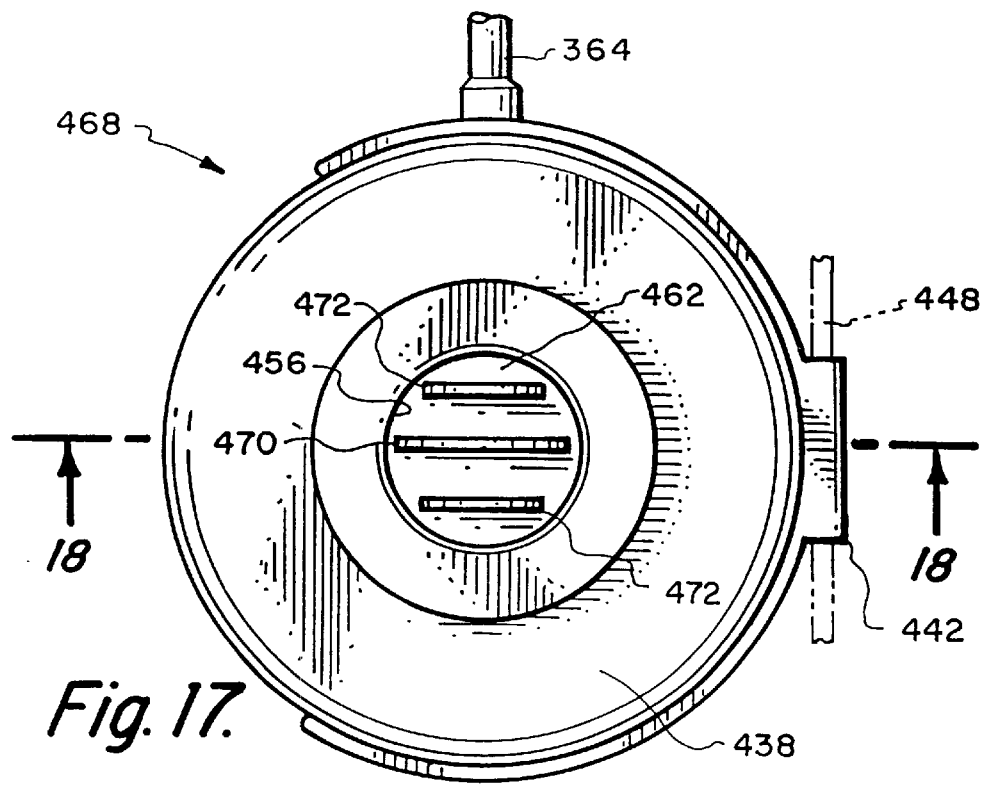
FIG. 17 is a top view similar to FIG. 15 showing another further embodiment of the reservoir of the present invention.
Figure 18:
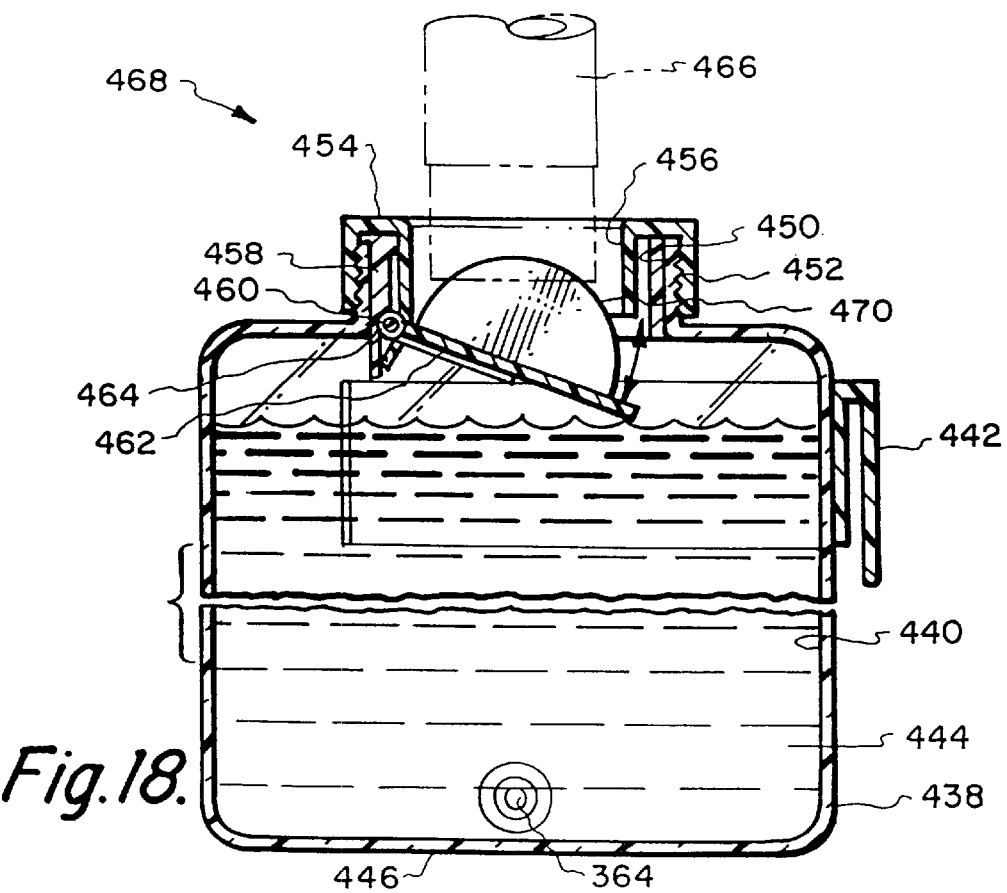
FIG. 18 is a cross-sectional view taken along line 18—18 of FIG. 17 again showing the valve plate connected with the reservoir in a displaced position permitting entry of liquid from a liquid source.

Referring particularly to FIG. 17 and 18, there is shown an embodiment 468 of reservoir, which is basically similar to embodiment 436 and like numerals have been used to refer to like parts. The main difference is that mounted on the valve plate 462 and extending transversely therefrom is a large baffle plate 470 and two small baffle plates 472, one located on each side of the large baffle plate 470 but spaced therefrom. Each of the baffle plates 470 and 472 have an arcuate periphery that assumes a domed configuration. When the faucet or garden hose 466 is moved against the baffle plates 470 and 472, the valve plate 462 will readily deflect prior to the conducting from the faucet or garden hose 466 to within the internal chamber 440. The baffle plates 470 and 472 will function to cause the valve plate 462 to deflect which will eliminate the possibility of any water shooting in an upward direction out of the fill opening 456, which might occur with the embodiment 436.

Figure 19:
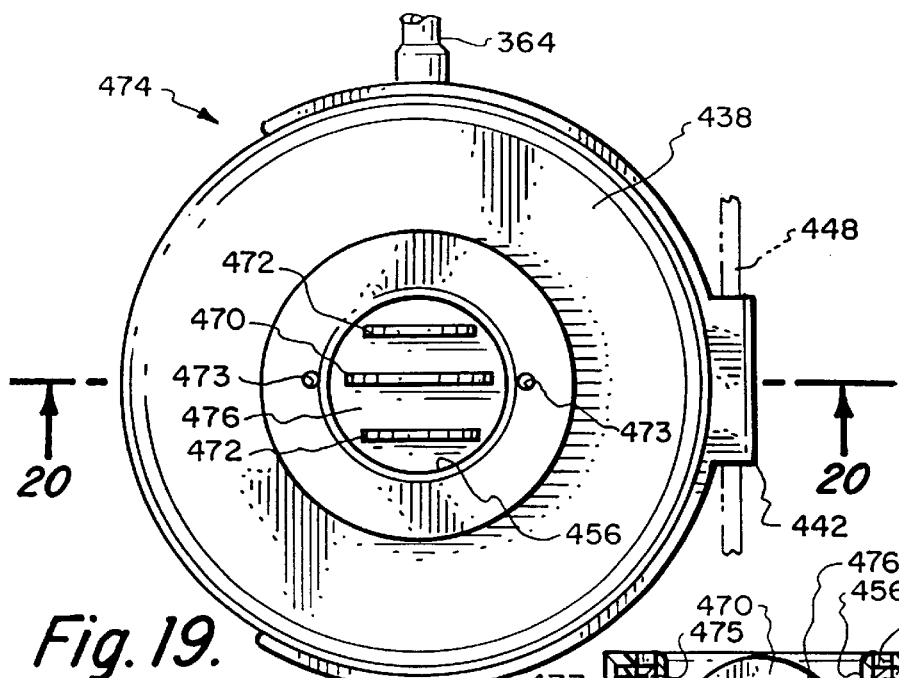
FIG. 19 is a top plan view similar to FIG. 17 showing still a further embodiment of the valve plate that is mounted in conjunction with the reservoir of the present invention.
Figure 20:
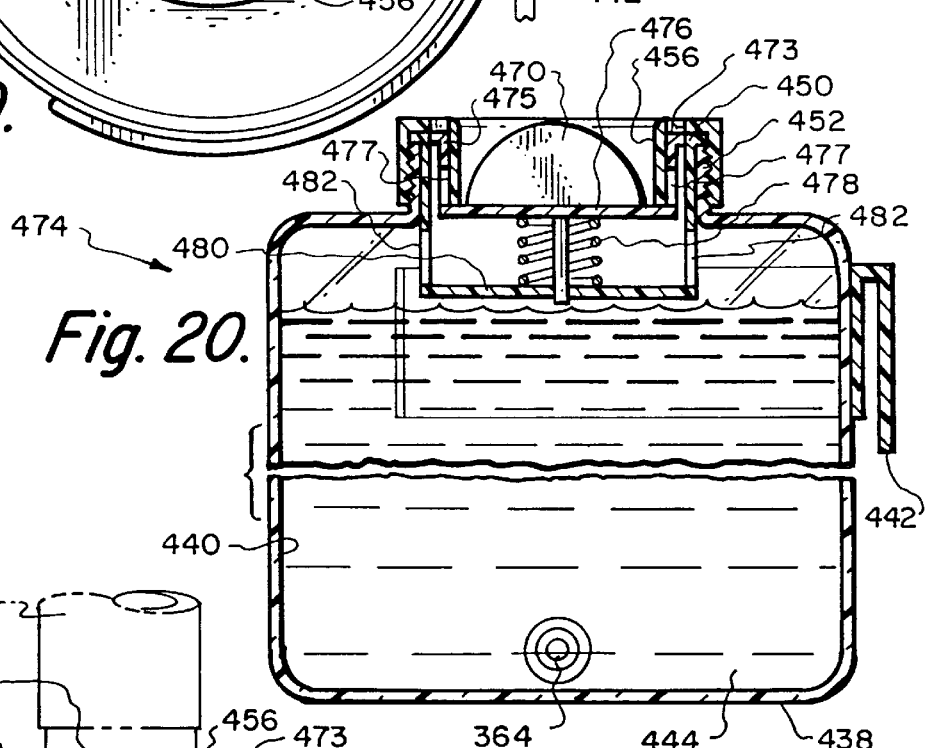
FIG. 20 is a cross-sectional view taken along line 20—20 of FIG. 19 showing the valve plate of an embodiment of this invention in the closed position.
Figure 21:
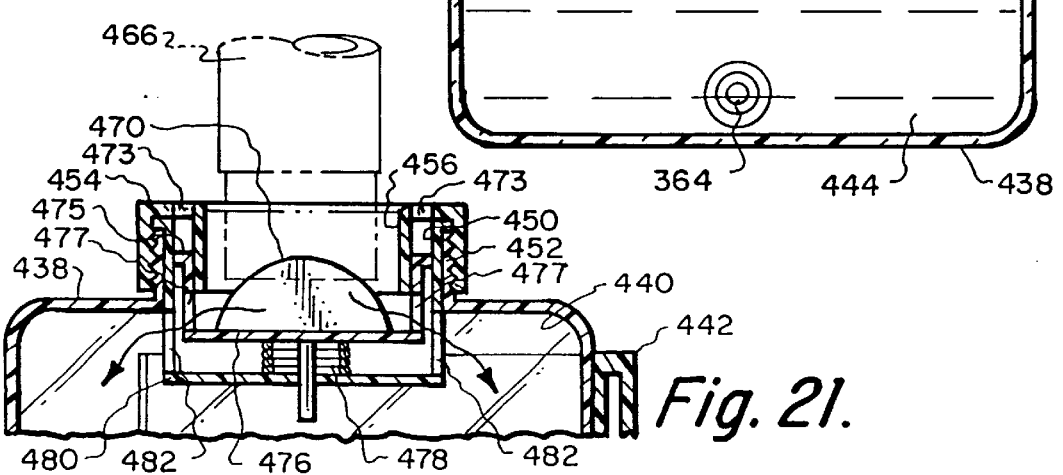
FIG. 21 is a partial cross-sectional view of the valve plate within the configuration of the reservoir shown in FIG. 20 with the valve plate in a displaced position permitting entry of liquid from a source to within the internal chamber of the reservoir.

Referring particularly to FIGS. 19–21, there is shown a still further embodiment 474 of reservoir with again like numerals being used to refer to like parts. The valve plate 476 has mounted thereon the baffle plates 470 and 472 but here the valve plate 476 is not hingedly mounted but is permitted to only move lineally against the action of a coil spring 478. Mounted onto valve plate 476 is a sleeve extension 475. Sleeve extension 475 has a series of holes 477. The coil spring 478 is mounted in conjunction with a cage 480. Within the cage 480 is located a series of holes 482. When the faucet or garden hose 466 is moved against the baffle plates 470 and 472, the valve plate 476 is lineally displaced compressing of coil spring 478. The cage 480 is to be formed as part of the cap 454 and has replaced the mounting flange 458. When the faucet or garden hose 466 is displaced against the valve plate 476, the water 444 is to flow from the faucet or garden hose 466 past the baffle plates 470 and 472, past the valve plate 476, through the holes 477 and 482 to within the internal chamber 440. Upon release of the faucet or garden hose 466 from the fill opening 456, the valve plate 476 will move automatically due to the action of the coil spring 478 to close the fill opening 456 and be located directly adjacent the cap 454.

Note that these reservoir fill embodiments, as illustrated in FIGS. 15–21, also serve as an air vent so that s water 444 is withdrawn from reservoir internal chamber 440 the small vacuum thus created partially pulls open valve plate 476 thus equalizing internal pressure with ambient pressure. Also note that these same reservoir fill embodiments may be used in conjunction with flexible walled reservoir 366.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A toy water gun valve assembly comprising:
    an inlet conduit for conducting of liquid from a liquid source, said inlet conduit terminating in a tube, said tube having a longitudinal center axis, said tube having a free end formed into a closed tip; and
    a sleeve surrounding said tube, said sleeve being attached to said inlet conduit, said sleeve terminating at an outer end, said outer end comprising a central passage, said sleeve being longitudinally movable relative to said tube parallel to said longitudinal center axis from a first position to a second position, said first position locates said closed tip in fluid tight connection with said central passage preventing flow of liquid through said central passage, said second position locates said outer end spaced from said tube permitting flow of liquid through said central passage.

2. The toy water gun valve assembly of claim 1 wherein said tube comprises a sidewall extending to said closed tip.

3. The toy water gun valve assembly of claim 2 wherein said sidewall comprises at least one liquid conducting opening.

4. The toy water gun valve assembly of claim 1 wherein said sleeve is spaced from said tube of said assembly.

5. The toy water gun valve assembly of claim 1 wherein said sleeve comprises an elastic bellows which permits adjusting movement of said sleeve between said first position and said second position.

6. The toy water gun valve assembly of claim 1 wherein said central passage comprises an annular ridge secured to said outer end.

7. The toy water gun valve assembly of claim 6 wherein said annular ridge is in tight connection with said closed tip when said sleeve is in said first position.

8. A toy water gun liquid valve assembly comprising:
    a conduit being designed to transport liquid therethrough from a liquid source, said conduit comprising an inlet and terminating in a tube, said tube having opposing ends, one of said ends forming a closed tip; and
    a movable sleeve, said tube being inserted within said sleeve, said sleeve having an outer end, said outer end having a central passage, said sleeve being movable relative to said tube from a first position to a second position, in said first position, said sleeve locates said closed tip and forms a fluid tight connection with said central passage thereby preventing flow of liquid through said central passage, in said second position, said sleeve locates said outer end spaced from said tube thereby permitting flow of liquid through said central passage.

9. The toy water gun liquid valve assembly of claim 8 wherein said tube has a longitudinal center axis.

10. The toy water gun liquid valve assembly of claim 9 wherein said sleeve is longitudinally movable relative to said tube parallel to said longitudinal center axis from said first position to said second position.

11. The toy water gun liquid valve assembly of claim 8 wherein said tube comprising a sidewall extending to said closed tip.

12. The toy water gun liquid valve assembly of claim 11 wherein said sidewall comprises at least one liquid conducting opening.

13. The toy water gun liquid valve assembly of claim 8 wherein said sleeve is connected to said conduit.

14. The toy water gun liquid valve assembly of claim 8 wherein said sleeve is spaced from said tube.

15. The toy water gun liquid valve assembly of claim 8 wherein said sleeve comprises an elastic bellows which permits adjusting movement of said sleeve between said first position and said second position.

16. The toy water gun liquid valve assembly of claim 8 wherein said central passage comprises an annular ridge secured to said outer end.

17. The toy water gun liquid valve assembly of claim 16 wherein said annular ridge is in tight connection with said closed tip when said sleeve is in said first position.

18. A method of manufacturing a toy water gun liquid valve assembly, said method comprising:
    providing a conduit being designed to transport liquid therethrough from a liquid source, said conduit comprising an inlet and terminating in a tube, said tube having opposing ends, one of said ends forming a closed tip;
    inserting said tube within a movable sleeve, said sleeve having an outer end, said outer end having a central passage, said sleeve being movable relative to said tube from a first position to a second position;
    in said first position, allowing said sleeve to locate said closed tip and form a fluid tight connection with said central passage thereby preventing flow of liquid through said central passage; and
    in said second position, allowing said sleeve to locate said outer end spaced from said tube thereby permitting flow of liquid through said central passage.

19. The method of claim 18 wherein said tube has a longitudinal center axis, and the method further comprises allowing said sleeve to longitudinally move relative to said tube parallel to said longitudinal center axis from said first position to said second position.

20. The method of claim 18 further comprising providing said sleeve with an elastic bellows which permits adjusting movement of said sleeve between said first position and said second position, and providing said central passage with an annular ridge secured to said outer end, said annular ridge is in tight connection with said closed tip when said sleeve is in said first position.

* * * * *